United States Patent
Delaage (10) Patent No.: US 7,072,105 B2
(45) Date of Patent: Jul. 4, 2006

(54) DEVICE FOR POSITIONING A PLATE USED FOR ANALYZING SAMPLES ON AN EXAMINATION DEVICE

(75) Inventor: Michel Delaage, Marseilles (FR)

(73) Assignee: TROPHOS, Marseille Cedex (FR)

( * ) Notice: Subject to any disclaimer, the term of this patent is extended or adjusted under 35 U.S.C. 154(b) by 0 days.

(21) Appl. No.: 10/501,233

(22) PCT Filed: Jan. 9, 2003

(86) PCT No.: PCT/FR03/00045

§ 371 (c)(1),
(2), (4) Date: Jul. 12, 2004

(87) PCT Pub. No.: WO03/058317

PCT Pub. Date: Jul. 17, 2003

(65) Prior Publication Data

US 2005/0068615 A1    Mar. 31, 2005

(30) Foreign Application Priority Data

Jan. 10, 2002  (FR) ................................... 02 00245

(51) Int. Cl.
*G02B 21/26* (2006.01)
(52) U.S. Cl. ..................... 359/393; 108/138
(58) Field of Classification Search ............... 359/391, 359/392, 393; 108/138, 143
See application file for complete search history.

(56) References Cited

U.S. PATENT DOCUMENTS

| 3,652,146 A | | 3/1972 | George | |
|---|---|---|---|---|
| 4,772,109 A | * | 9/1988 | Cutburth et al. | 359/393 |
| 5,357,366 A | * | 10/1994 | Marchlenski | 359/393 |
| 5,438,451 A | * | 8/1995 | Schweizer | 359/393 |
| 5,684,628 A | | 11/1997 | Gerhard | |
| 5,812,310 A | | 9/1998 | Stewart et al. | |
| 6,252,705 B1 | * | 6/2001 | Lo et al. | 359/393 |

FOREIGN PATENT DOCUMENTS

FR    2 808 888 A    11/2001

* cited by examiner

*Primary Examiner*—Alessandro Amari
(74) *Attorney, Agent, or Firm*—Nixon & Vanderhye P.C.

(57) ABSTRACT

The invention relates to a device for positioning a biological sample analysis plate on an observation device comprising an observation lens and a chassis having a plate support assembly [20]. This assembly comprises a first frame [21] and a second frame [22] able to slide in a plane perpendicular to the observation axis, assumed to be vertical, with the first and second frames each able to move in a direction perpendicular to the direction of movement of the other frame; and a third frame [23] supported by the second frame [22] by means [30] used to maintain said third frame in a plane perpendicular to the observation axis, while leaving the movement free in a vertical plane.

12 Claims, 4 Drawing Sheets

DEVICE FOR POSITIONING A PLATE USED FOR ANALYZING SAMPLES ON AN EXAMINATION DEVICE

This application is the U.S. national phase of international application PCT/FR03/00045, filed in French on 09 Jan. 2003, which designated the U.S. and claims priority to FR Application No. 02/00245, filed 10 Jan. 2002; The entire contents of these applications are incorporated herein by reference.

The present invention relates to a device for positioning a plate or other support comprising samples on to an observation or analysis device, allowing the observation or sequential analysis of several samples arranged side by side on the plate, or of several areas of one single sample.

The present invention is designed to facilitate the rapid digital analysis of large objects by CCD sensors. These are of limited size (5 to 7 mm) and the high-resolution digital reading of objects measuring 10 cm or over requires repetition of the images under conditions of reproducibility, sometimes with a pixel-to-pixel connection. This high resolution also means a low field depth incompatible with the inevitable deformations of the object, whether involving a glass plate (or slide) or a compartimentalized culture plate.

Patent application No. WO 01/88593 describes a process designed to maintain the focus on an analytical device, in exchange for lateral play between the sample and its support. Such a device is therefore incompatible with a pixel-to-pixel image connection. Neither does it enable image change kinetics to be recorded appropriately. Other, more classic systems are designed to hold the sample support in place to obtain the kinetics and, if required, a pixel-to-pixel connection. However, since such systems have no mobility in the observation axis, they do not allow the lens to be automatically focused on the samples.

Thus the analysis devices described previously in the state of the art have disadvantages which lie in the absence of reproducibility of the readout and incompatibility with the rapid scanning of multiple samples, for example when the same plate has to be analysed at different times to obtain true kinetics on the cells or other individual samples identified by the pixel numbers on each image. With previous devices, there is no guarantee that the analysed cells are the same from one reading to the next. This lack of precision may reach a level of over 100 microns, which is excessive for kinetics applications. Moreover, the analysis plates used usually have surface evenness defects in their underside forming the well bottoms so that these defects cause variations in the distance between the lens and the sample to be analysed and prevent steady focusing.

Having regard to these inaccuracies, the complete observation of a plate or large samples is required in order to correct frequently lens focusing to compensate for distance variations and/or to correct the horizontal positioning so as to maintain the framing of the image on the sensor.

This need to proceed frequently to adjustments, either of the lens focus or the positioning, reduces sample image acquisition speed and may make high-resolution readings impossible.

The purpose of the invention is to avoid these disadvantages. The present invention now provides a device which allows to ensure both accurate positioning of the analysis plate (or other support) in front of a lens, to reproduce this positioning for repeated measurements, to ensure controlled plate movement and to maintain focus. The present invention thus provides a sample support positioning device for an analytical objective, making it possible to carry out reproducible and rapid measurements of large samples and/or multiple samples. The invention also applies to any analytical device incorporating a positioning device of this type.

It is therefore an object of the invention to provide a device for positioning a plate comprising one or more samples (or adapted to take one or more samples) on an observation or analytical device comprising a lens for observing or analysing at least part of a sample following an observation axis from an observation face and a chassis having a support assembly, wherein the support assembly comprises:

a first movable sliding frame in a plane perpendicular to the observation axis, a second frame supported by the first frame able to slide in said plane perpendicular to the observation axis; the first and second frames being movable, each in a direction perpendicular to the direction in which the other frame moves, and a third frame supported by the second frame by means used to maintain this third frame blocking said third frame in a plane essentially perpendicular to the observation axis, while leaving the third frame free to move essentially along the observation axis, said third frame presenting means enabling to immobilise the plate.

According to particular embodiments of the invention:

the support assembly comprises means used to immobilise the third frame in the vertical position for placing the analysis plate, the device comprises means for controlling the vertical position of the observation face of the analysis plate with respect to the lens, the means used to maintain the third frame comprise at least one thin spring plate forming a pivot, preferably located in the observation plane, said spring plate being connected to the second and third frames respectively, the spring plate or plates forming a pivot extend preferably perpendicular to the direction of movement of the second frame, alternatively, the means used to hold the third frame comprise on one hand a hinge pin located between the second and third frames, preferably extending perpendicular to the direction of movement of the second frame and on the other hand, at least one torsional spring located between said second and third frames, the third frame moves essentially along the observation axis, generally in the vertical plane, and at a limited pivoting angle, i.e., usually of less than 0.5°, which is basically determined by the position of the plate on the lens, the means of immobilising the plate are made up of supporting shoes arranged around the inner periphery of the third frame and a cam mounted on the third frame which can be pivoted between a retracted position and a projecting position inside the third frame so as to immobilise the plate, the plate immobilising cam comprises a support means on the base of the plate, e.g. an adjustable means such as a screw, whose head or tip can rest on the base of the plate, at least part of the supporting shoes, in particular the ones located on the edges of the frame opposite the immobilising cam, comprises a recess intended for taking the base of the plate, the means used to immobilise the third frame are constituted of two opposing limit stops, each mounted on one side of the first frame, extending parallel to the direction of movement of the second frame and by two opposing ties, each fixed perpendicular to one side of the third frame, extending parallel to said direction, with each limit stop comprising an inclined face designed to work in conjunction with the free end of the corresponding tie when the second and third frames move in this direction, the means of control are constituted of a strut fixed with respect to the lens and having a bearing area taking the observation face of the plate, the means of control are constituted of a magnetic or piezoelectric plate lift system, the third frame is open or closed, motions of the first and second frames are motorised.

The invention also relates to an observation or analysis samples device which comprises a plate positioning device as described above. The observation or analysis device advantageously comprises a light source for lighting at least part of a sample and image acquisition means.

An observation or analysis device according to the invention typically comprises a lens for the observation or analysis of at least part of a sample following an observation axis from the plate observation face and a support assembly for this plate as described above, suited to ensure relative movement between the plate and the observation axis in a plane perpendicular to the observation axis but leaving the movement free along the observation axis which is assumed to be vertical. It also comprises lighting means for at least part of a sample and means for acquiring an image when coming out of the lens.

The light source may be a lamp, a laser or an array of electroluminescent diodes.

To observe or analyse the samples, the plate is placed above or below the lens of the device, preferably above it, the axis of which is assumed to be vertical. The samples are observed through the bottom of each well, that is to say through the lower face of the plate, this lower face being the observation face, or directly above the sample. The samples pass one by one through the view of the lens by the movement of the plate in a plane perpendicular to the observation axis by means of the support assembly. This assembly is adapted to maintain the plate essentially or only on its periphery, thus leaving the plate observation face free. To maintain the focus, the observation face rests on a strut which itself rests on the lens, in the observation axis. Such a system is particularly useful for rapid samples analysis.

The rapid cellular analysis of a large number of samples is a necessity in the pharmaceutical industry for the high-through put screening of new active substances, and in the cosmetics industry, in which cellular models are used to test new substances and monitor manufacture. Sample biological analysis is also important in the fields of diagnosis or pharmacogenomics (predisposition to a pathology, a subject's potential response to a treatment, detecting allergens, etc.).

The devices according to the invention can be used for rapid analysis of a large number of samples arranged on a plate or for the analysis of samples (or objects) of large size, requiring the production and connection of several images. Typically, the samples are biological samples which might, for example, comprise cells, in particular adherent, mammalian, prokaryotic, vegetal cells, nucleic acids, proteins (or polypeptides), viruses and other organisms, e.g. pathogens, etc. The sample may also comprise synthetic particles, etc. The sample may also be a large sample, such as the section of an animal (e.g. a rodent) or an organ.

Furthermore, although the description and examples refer more specifically to a positioning or analytical device using a plate, it must be understood that the devices according to the present application are adapted for the use of any adapted support such as—besides plates (e.g. multiwell plates)-slides, membranes, etc.

The invention will be better understood on reading the description to follow, given solely as an example and which refers to the appended drawings, in which.

Figure 1:
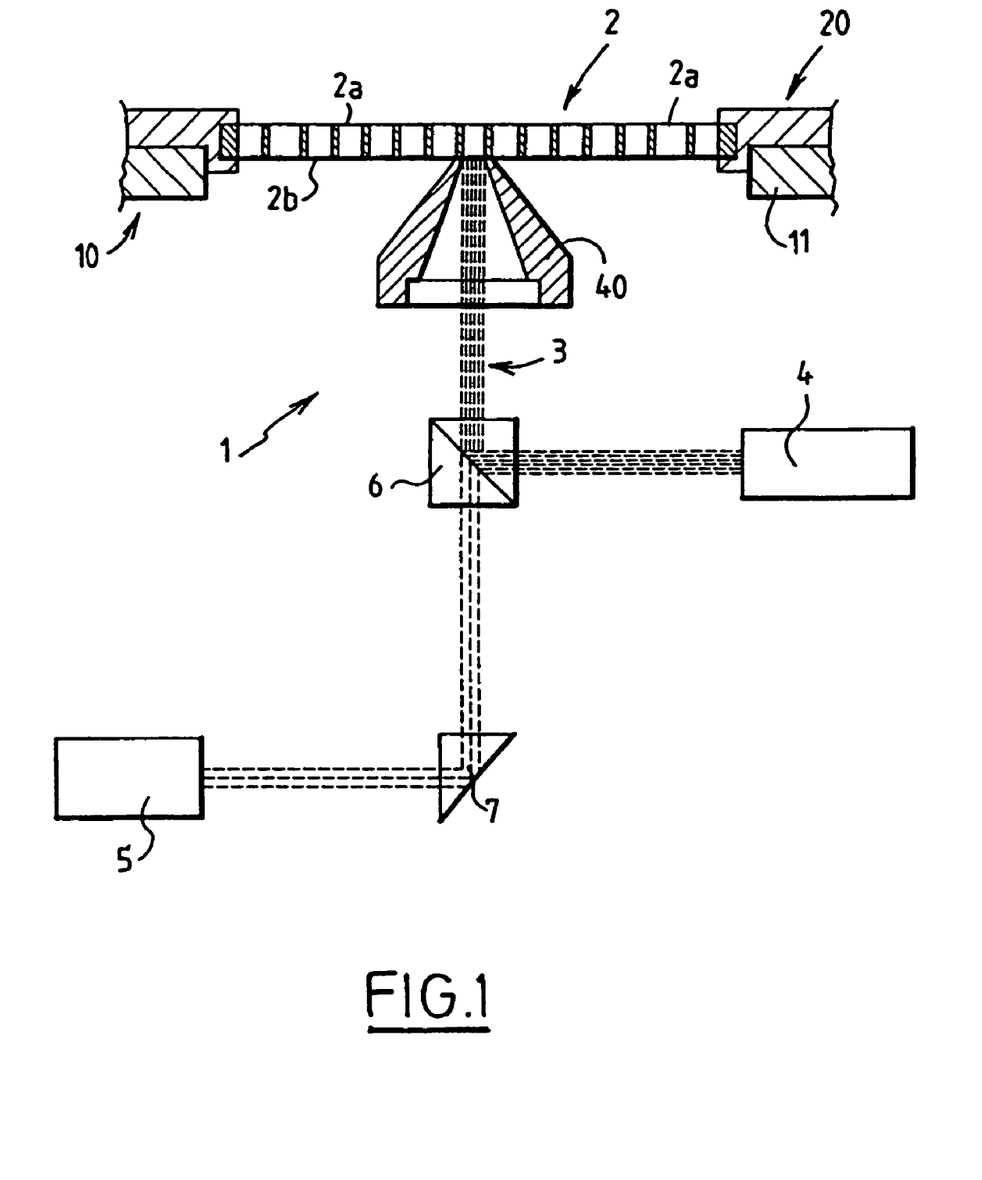
FIG. 1 is a schematic view of a vertical section of an observation system with an analysis plate positioning device, according to the invention.

FIG. 1 shows schematically an observation device that is described in its entirety by reference 1 and which comprises a positioning device described by general reference 10 (shoe not shown) of a biological samples analysis plate [2], an observation lens [3], a local plate [2] lighting source [4], a camera [5] placed behind the lens [3] and an information processing unit, not shown, such as a microcomputer connected to the camera [5] and to the movement motors of frames 1 and 2. The strut [40] ensures a constant distance between the lens and the observation face of the plate [2]. The positioning device [10] comprises a chassis [11] having a support assembly [20] for the plate [2]. The plate support assembly itself comprises three frames [21, 22, 23], not shown, which ensure the controlled and accurate retention, movement and positioning of the plate [2].

A prism [6] returning the incident beam coming from the source [4] is located behind the lens [3] to direct the incident beam along the optical axis of the lens [3] towards the sample.

Similarly, a prism [7] or inclined mirror is located behind the lens [3] to deflect the "out" beam from the lens [3] towards the camera [5].

This observation device [1] is intended for the rapid observation of samples contained in adjacent wells [2a] of the plate [2].

The plates used to hold the samples are in the general form of a tray. They show an array of adjacent cells, called wells, in all or part of which the sample is contained. These wells present generally axes parallel one to each other and extend along the thickness of the plate. They emerge on the upper surface of the plate and are blocked off by a bottom which generally forms the underside of the plate. Thus, the adjacent well bottoms are generally connected one to each other such that the underside of this plate is essentially continuous.

As shown in FIG. 1, plate [2] preferably includes a continuous underside [2b] forming the bottom of wells [2a] and providing an observation face through which the samples are observed.

The wells [2a] open at the upper surface of the plate [2] and are approximately cylindrical with a circular or square section and have an approximately flat bottom.

We can now (see FIGS. 2 and 3) describe more precisely the support assembly [20] for the plate [2].

Figure 2:
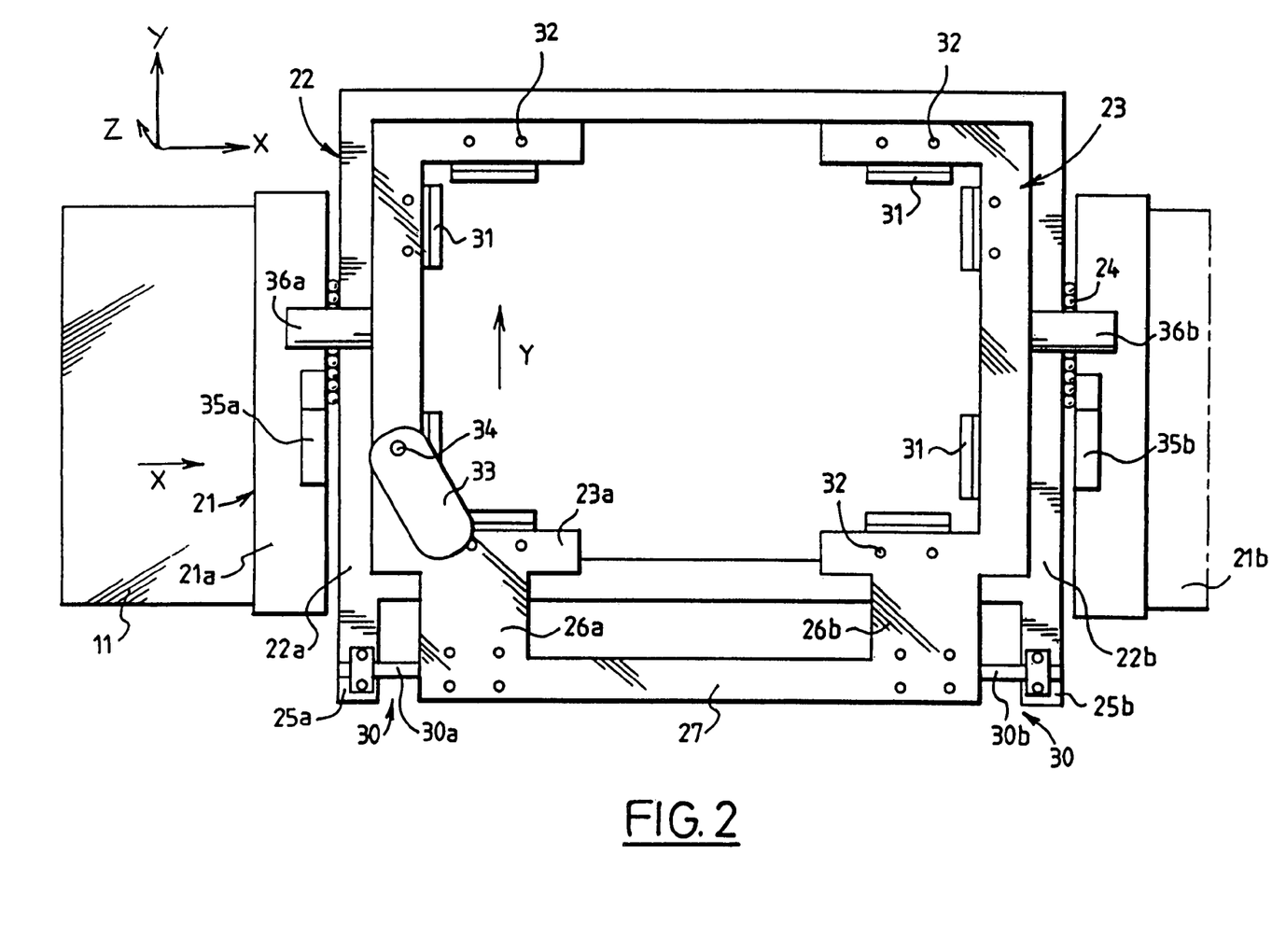
FIG. 2 is a schematic top view of the positioning device according to the invention.

For sake of simplicity, the frame [11] is shown only partially in FIG. 2.

Figure 3:
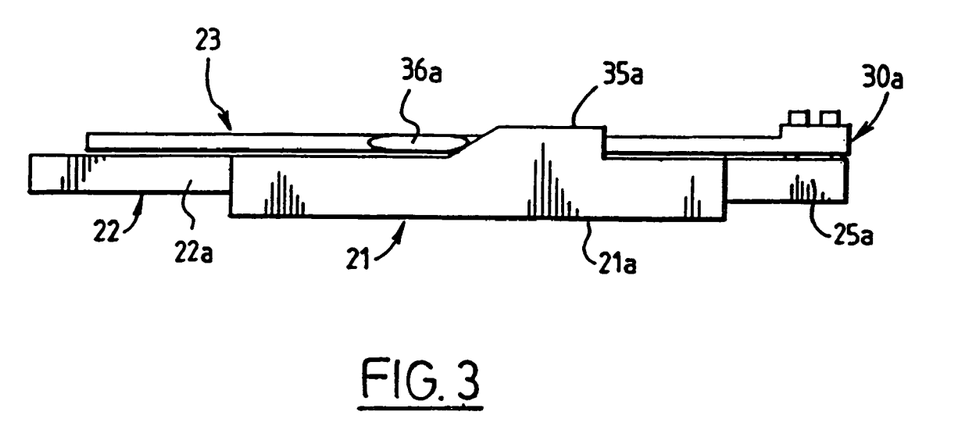
FIG. 3 is a side view of the positioning device shown in FIG. 2.

The support assembly [20] comprises three frames carried one by another, a first frame [21] a second frame [22] and a third frame [23].

The first frame [21] which is only partly shown in FIG. 2, is able to slide horizontally in a plane perpendicular to the observation axis of the observation lens [3] in relation to the chassis [11] for example along ballbearing runners, not shown, or by any other appropriate means.

This frame [21] is preferably movable in a X direction of the XYZ orthonormal reference, as shown in FIG. 2.

The second frame [2], supported by the first frame [21], is able to slide horizontally in the plane perpendicular to the observation axis and in a Y direction of the XYZ orthonormal reference.

Thus the first frame [21] and the second frame [22] are each able to move in a direction perpendicular to the direction in which the other frame moves.

The second frame [22] is movable in respect to the first frame [21] for example along the ballbearing runners [24] or by any other appropriate means.

As shown in FIG. 2, the sides [22a and 22b respectively] of extending frame [22] parallel to Y direction motion of this frame [22], each comprise an extension, respectively 25a and 25b.

The third frame [23] is supported by the second frame [22] by means used to maintain this third frame [23] immobilising said third frame [23] in the plane perpendicular to the observation axis of the observation device [3], while leaving the movement free in a vertical plane and at a limited pivoting angle.

For this purpose, the third frame [23] comprises on one of its sides, e.g. 23a, extending perpendicular to Y direction motion of the second frame [22], two parallel extensions respectively 26a and 26b extending perpendicular to said side [23a]. The free ends of the extensions [26a and 26b] are connected by a cross-piece [27] supporting the mounting flanges of the spring plate or plates. It must be understood that the third frame [23] may be closed or open depending on the requirements of the environment.

The means used to maintain the third frame [23] comprise at least one thin spring plate forming a pivot between the second frame [22] and the third frame [23].

In the embodiment shown in FIG. 2, the means of holding the third frame [23] are provided by a first metal foil spring plate [30a] fixed between the extension [25a] of the second frame [22] and the extension [26a] of the third frame [23]; and a second metal foil spring plate [30b] fixed between the extension [25b] of the second frame [22] and the extension [26b] of the third frame [23]. These spring plates [30a and 30b] form a pivot and extend perpendicular to Y direction motion of the second frame [22]. In one particular mode, the means of holding the third frame are formed by a single metal foil spring plate [30] which goes from extension 25a to extension 25b, the extensions to which it is fixed.

These spring plates [30, 30a and 30b], which are deformable in rotation, act as pivots, inhibiting at the same time the movement of the third frame [23] in the plane perpendicular to the observation axis of the observation lens [3] and allowing this third frame [23] to move in a Z direction of the orthonormal reference, that is to say along the observation axis. When the system is in use, movement in a Z direction is at a limited pivoting angle which depends notably on the position of the plate with respect to the lens. Typically, this angle is inferior to 0.5°. By means of the positioning device according to the invention, a vertical movement of ±150 µm is translated into a very small horizontal movement, of ±0.15 µm, which is very much smaller than the size of a pixel.

According to one embodiment, not shown, the means of holding the third frame [23] may also consist, on the one hand, of a hinge pin located between the second frame [22] and the third frame [23] and extending perpendicular to Y direction motion of the second frame [22], and, on the other hand, by at least one torsional spring located between said second and third frames so as to hold this third frame [23] on the second frame [22] while enabling it to pivot around the hinge pin.

The positioning system also comprises means of immobilising the analysis plate [2] on the third frame [23] as well as means of vertically immobilising the third frame [23] in order to place the analysis plate [2].

Figure 4:
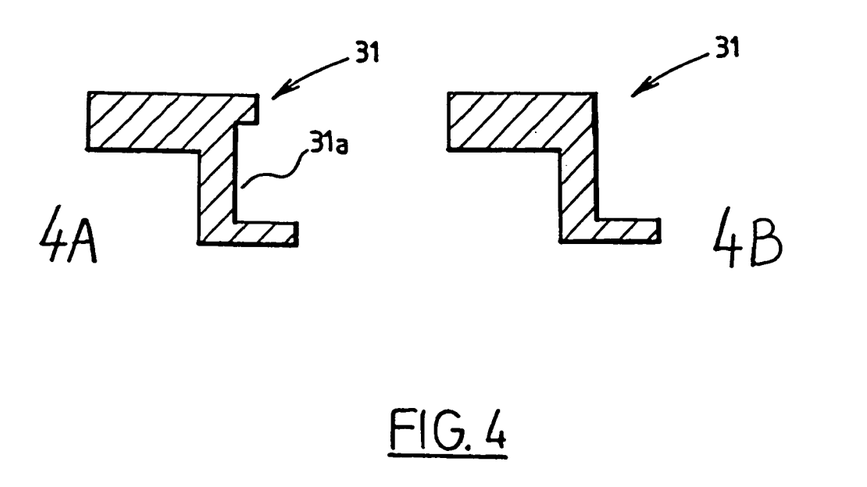
FIG. 4 is a schematic view of a vertical section of an analysis plate positioning shoe, with a recess (FIG. 4A) or with no recess (FIG. 4B).

As shown in FIG. 2, means of immobilising the plate [2] consist of shoes [31] arranged around the inner periphery of the third frame [23], wherein each shoe [31] or preferably part of the shoes, in particular those located on the sides of the frame opposite the immobilising cam, comprises a recess [31a], as shown in FIG. 4, designed to take the base of the plate [2]. The shoes [31] are fixed to the third frame [23] by appropriate means consisting for example of screw fastenings [32]. Different sets of shoes can be used, as an alternative, adapted to the thickness of the base of the analysis plates.

Figure 5:
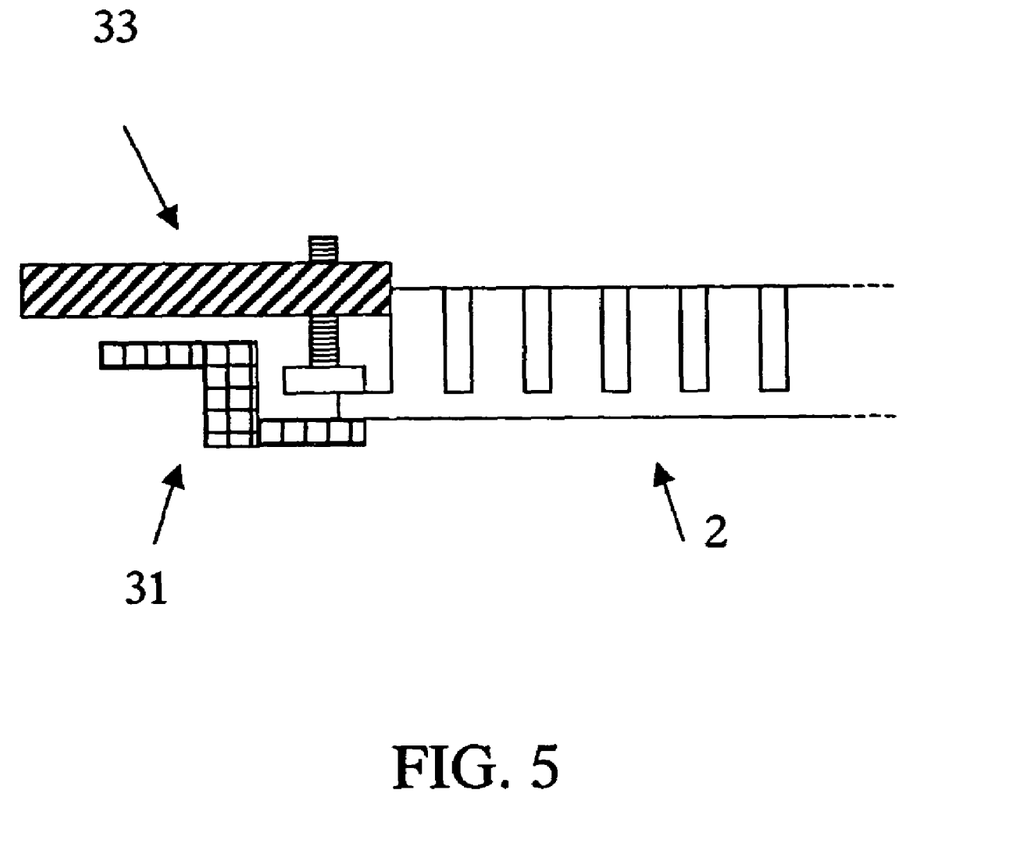
FIG. 5 is a schematic view of a vertical section of an immobilising cam of the analysis plate, comprising a means of support on the base of the plate.

The means used to immobilise the plate [2] also comprise a cam [33] which is able to pivot around a vertical hinge pin [34] between a retracted position and a projecting position inside said third frame [23] so as to immobilise the plate [2]. The cam usefully has itself a screw whose head or tip is adjusted to rest on the base of the plate [2] (FIG. 5)

The means used to immobilise the third frame [23] for placing a plate [2] consist of two opposing limit stops, 35a and 35b respectively, each located on a side, respectively 21a and 21b, of the first frame [21] extending parallel to Y direction motion of the second frame [22].

As shown in FIG. 3, the limit stops [35a and 35b] each have an inclined face.

The means used to immobilise the third frame [23] also comprise two tabs, respectively 36 and 36b opposite each other, each mounted on one side of the third frame [23], and extending parallel to Y direction motion of the second frame [22].

Each of the tabs [36a and 36b] is designed to work in conjunction with the inclined face of the corresponding limit stop [35a and 35b] so as to immobilise vertically the third frame [23], as will be seen later.

Lastly, the positioning device comprises means of controlling the vertical position of the observation face [2b] of the analysis plate [2] with respect to the observation lens [3].

According to a first embodiment shown in FIG. 1, the means of control are comprised by a strut [40] interdependent with the lens [3]. At its free end, this strut [40] defines a surface supporting the underside [2b] of the plate [2] in the immediate vicinity of the well bottom containing the sample to be observed or analysed. The other end of the strut [40] rests on the end of the lens [3].

According to a second embodiment, the means of controlling the vertical position of the observation face [2b] of the analysis plate [2] are comprised by a magnetic or piezoelectric system for lifting this plate [2]. The means of control used to move the third frame [23] along the observation axis consist of the reflection of a light beam, which may be that of the exciting light, reflected on to the bottom of the plate [2] or by the sample plate bottom interface.

In this case, the reflected light is detected by a group of diodes and a control loop secures the third frame [23] in Z direction so as to maintain the balance of the signals on the diodes.

For observation of the content of an analysis plate [2] the support assembly [20] moves this plate [2] in the plane perpendicular to the observation axis to bring each sample in succession into the view of the observation lens. During this movement and during the properly speaking observation of a sample, the plate [2] is held in the third frame [23] by the shoes [31] and by the cam [33] which is placed in a projecting position inside the third frame [23], as shown in FIG. 2.

Additionally, under the effect of the weight of the moving element (third frame [23]+plate [2]) and the plates [30a and 30b], which exert a return force, the third frame [23] holds the observation face [2b] of the plate [2] against the end of the strut [40] or at a predetermined fixed distance from the observation lens [3].

Thus motion of the plate [2] in the plane perpendicular to the observation axis is ensured by the first frame [21] in X direction and by the second frame [22] in Y direction so as to bring the wells [2a] successively into the observation axis of the observation lens [3].

For this purpose, the motions of the frames [21 and 22] are motorised.

To put another analysis plate [2] into position, the third frame [23] must itself be immobilised in Z direction.

For this purpose, the second frame [22] and consequently the third frame [23] are moved in the plane extending perpendicular to the observation axis until the tabs [36a and 36b] come into contact with the limit stops [35a and 35b].

Motion in Y direction continues such that the tabs [36a and 36b] slide along the inclined faces of the limit stops [35a and 35b], which lifts up the third frame [23] and said frame [23] comes and rests against the limit stops [35a and 35b] so as to immobilise it vertically. At this time the cam [33] frees the previous analysis plate [2], which can be moved and replaced by another analysis plate [2].

Motion of the cam [33] can be coupled mechanically or electrically with the movement of the third frame [23], using the appropriate means. In particular, it can have a lug actuated by a limit stop interdependent with the first frame [21]. The cam [33] can also be moved manually.

When placing a new analysis plate, the plate [2] is first placed on the shoes [31], then the cam [33] pushes this plate [2] the base of which engages in the recesses [31a] of the shoes [31]. The cam [33] itself rests on the base of the plate [2] and inhibits any movement of this plate [2] with respect to the third frame [23]. The movement continues along Y and the interdependent third frame [23] and plate [2] descends along the limit stops [35a and 35b] until the observation face of the plate [2] comes in contact with the distance piece [40]. Acquisition of the images can then commence.

The positioning device according to the invention not only ensures that the analysis plate and hence the wells in front of the lens are positioned correctly but also enables this positioning to be reproduced for repeated measurements, while maintaining the focus, which in turn makes it possible to carry out genuine kinetics on individual cells or to produce images on different regions of a large sample so as to connect them pixel to pixel.

The devices and processes according to the invention can be used to analyse samples of various origins and kinds, marked according to any method known from the man skilled in the art. These may be samples comprising mammalian cells (animal or human, e.g. nervous, tumoural, immunological cells, etc.), bacterial cells, vegetal cells and yeast cells, pathogens, viruses, any biological sample or collection, sections of organs or of entire animals, etc. The processes and devices are adapted for the analysis or detection of polypeptides, nucleic acids, lipids, etc. They are especially useful for measuring the effect of test compounds, notably of product libraries, on cell populations, for example, in high-through put tests of product effectiveness, selectivity or toxicity.

Thus in one particular embodiment, the invention also concerns a high-through put analytical (or screening) method using a device as described above, more particularly one in which the sample comprises a cell population brought into contact with a fluorescent colouring agent representing a cell function (e.g. proliferation, growth, maturation, differentiation, death, survival, apoptosis, etc.), the sample being brought into contact, in separate plate wells, with test collection compounds, the compounds causing variations in the determined fluorescent marking intensity. The cell population is for example a population of neurons, notably of human or animal origin.

In one particular embodiment, the fluorescent colouring agent is associated with an antibody, itself coupled with a cellular antigen. These coupled antibodies are available on the market, for example those produced by the Immunotech company (Marseille, France).

In another embodiment, the invention lies in a process used to detect the presence (or the quantity) of a bacterium in one or more samples, comprising bringing the sample into contact with a bacterium marker, and examining the presence of marking by using a device such as described above. These markers may be highly bacterium specific, like the bacterial genome specific nucleic acid probes associated with fluorescence markers, or non-specific such as acridine orange and all nucleic acid colouring agents. There are many of these to be found on the market, see for example the Molecular Probes (Eugene, Oreg., USA) catalog.

In another embodiment, the invention lies in a process to detect the presence (or the quantity) of a virus in one or more samples, comprising bringing each sample into contact with a virus-specific marker, and analysing the presence of the marking by using a device such as described above.

According to another embodiment, the invention lies in a process to analyse a whole or partial section of an organ or of an animal, comprising the analysis, by using a device such as described above, of the presence of a marker in different regions of the section. The organ may be all tissue or organ of interest, such as liver, kidney, heart, lung, brain, cerebellum, spleen, etc. The animal may be any non-human animal, e.g. a mammal, an insect, etc., for example a rodent.

According to another embodiment of the invention, the system comprises filters on the path of the fluorescent light which delimit the spectral regions, e.g. 530, 585 and 650 nanometer dichroic filters enabling the use of up to four different fluorescent markers, with a single 488-nm excitation as used in flow cytometry. These colouring agents are used to analyse several parameters in respect of the same cell. Similarly, the excitation beam can combine two sources, either simultaneously by means of a dichroic mirror, or successively by means of an ordinary mobile mirror, or again by separating the solid angles of excitation, which further extends the possibilities of multiparameter analysis.

The invention can also be used for ball marking analysis, notably of protein-protein interactions, immune complexes, hybridisations, etc.

Here, the method of acquisition on several wavelengths is particularly advantageous as it makes possible to distinguish several particle categories. If these particles are of a uniform size, the method can distinguish particles with quantified levels of fluorescent colouring agent, for example around ten different levels. These particles may be the seat of analytical reactions, e.g. immunoanalysis; the reaction associated with each particle category can be quantified by another marker, emitting on another wavelength, the same as for all of the reactions. Thus it is possible to record as many different analytical reactions as there are distinguishable particle categories.

Another use of these types of particle is coding, when they are associated with a combinatory synthesis process. Analysis of the particles is an accurate reflection of the associated chemical compound; identification can be checked outside the laboratory carrying out the measurements by electronic data transmission.

In another embodiment, a homogeneous population of fluorescent particles is used to define a correction surface for the excitation energy, which is not uniform over all the field of observation; more particularly, the lasers show a Gaussian energy distribution. The measurement energy of the re-emitted by each particle reflects the excitation energy level at the point at which it is found. With a small number of particles randomly distributed over the surface observed, it is possible to define a surface, by interpolation, which can then be used to normalise the level of the pixels observed on unknown samples. A uniform emitting surface can also be used for this normalisation.

The invention can further be used to analyse the nucleic acid deposits after hybridisation with probes, notably on chips, microarrays, etc. This may involve notably DNA deposits following hybridisation by corresponding DNA or RNA sequences, from a cell or a sample and marked by a fluorescent element. These deposits are preferably regularly arranged with up to 5000 deposits which the device can read in a single operation. Several blocks of deposits placed side by side can be read sequentially.

The invention can also be used to analyse deposits of polypeptides (e.g. proteins) notably on the bottom of the support (e.g. the bottom of a plate), a chip, microarrays, etc., revealed by antibodies or other ligands marked, typically fluorescent. These deposits may be notably deposits of allergens, bacterial antigens, autoimmune antigens, tumour-specific antigens, etc., possibly in combination(s). Preferably, they are arranged regularly and may consist of up to 5000 deposits. Typically, they are brought into contact with a biological sample of a subject for which the system is looking for the presence of antibodies directed against one or more of these polypeptides. The samples are then incubated with a second tell-tale reagent, for example a fluorescent antibody, and the device can analyse the results in a single operation. Several blocks of deposits placed side by side can be read sequentially.

The invention claimed is:

1. A device for positioning a plate [2] comprising one or more samples on an observation or analysis device comprising an observation or analysis lens [3] of at least part of a sample along an observation axis from an observation face [2b] of the plate [2] and a chassis [11] having a support assembly [20] for the plate [2], wherein this support assembly [20] comprises:

a first movable frame [21] sliding in a plane perpendicular to the observation axis;

a second movable frame [22] supported by the first frame [21] sliding in said plane perpendicular to the observation axis, the first and second frames [21 and 22] being movable in a direction perpendicular to the direction in which other frame moves, a third frame [23] supported by the second frame [22] by means [30] used to maintain the third frame [23] blocked in the plane perpendicular to the observation axis, while leaving the third frame [23] free to move essentially along the observation axis, said third frame [23] presenting means [31 and 33] to immobilise the plate [2], and means [40] for ensuring a constant distance between the lens [3] and the observation face [2b] of the plate [2].

2. A device according to claim 1, wherein it comprises means (35a, 35b; 36a, 36b) used to immobilise the third frame [23] in the vertical position for placing the plate [2].

3. A device according to claim 1, wherein the means used to maintain the third frame [23] comprise at least one thin spring plate [30a, 30b] forming a pivot, preferably located in the observation plane, said spring plate [30a, 30b] being connected respectively to the second [22] and third frame [23].

4. A device according to claim 1, wherein the means used to maintain the third frame [23] comprise a hinge pin located between the second and third frames [22, 23] preferably extending perpendicular to the motion direction of the second frame [22] and at least one torsional spring located between said second and third frames [22, 23].

5. A device according to claim 1, wherein the means used to immobilise the plate [2] are comprised by supporting shoes [31] arranged around the inner periphery of the third frame [23] and a cam [33] mounted on the third frame [23] which can be pivoted between a retracted position and a projecting position inside the third frame [23] so as to immobilise the plate [2].

6. A device according to claim 1, wherein the means used to immobilise the plate [2] are comprised by supporting shoes [31] arranged around the inner periphery of the third frame [23] and a cam [33] mounted on the third frame [23] which can be pivoted between a retracted position and a projecting position inside the third frame [23] so as to immobilise the plate [2] and wherein said cam comprises a screw whose head or tip can rest on the base of the plate.

7. A device according to claim 1, wherein the means used to maintain the plate [2] in the third frame [23] are comprised by supporting shoes [31] arranged around the inner periphery of the third frame [23] and a cam [33] mounted on the third frame [23] which can be pivoted between a retracted position and a projecting position inside the third frame [23] so as to immobilise the plate [2] and wherein part of the said shoes comprises a recess intended for taking the base of the plate.

8. A device according to claim 1, wherein the means used to maintain the third frame are comprised by two opposing limit stops [35a and 35b], each mounted on one side of the first frame [21] extending parallel to the motion direction of the second frame [22] and by two opposing ties [36a and 36b] each fixed perpendicular to one side of the third frame [23] extending parallel to said direction, with each limit stop [35a, 35b] comprising an inclined face designed to work in conjunction with the free end of the corresponding tie [36a136b] when the second and third frames [22 and 23] move in this direction.

9. A device according to claim 1, wherein it includes means [40] of controlling the vertical position of the observation face [2b] of the plate [2] with respect to the observation lens [3] and wherein said means of control are comprised by a strut [40] fixed with respect to the observation lens [3] and having a bearing area of the observation face [2b] of the plate [2].

10. A device according to claim 1, wherein the motions of the first and second frames [21 and 22] are motorised.

11. A sample observation or analysis device, wherein it comprises a positioning device for a plate [2], said positioning device comprising one or more samples on an observation or analysis device comprising an observation or analysis lens [3] of at least part of a sample along an observation axis from an observation face [2b] of the plate [2] and a chassis [11] having a support assembly [20] for the plate [2], wherein this support assembly [20] comprises:

- a first movable frame [21] sliding in a plane perpendicular to the observation axis;
- a second movable frame [22] supported by the first frame [21] sliding in said plane perpendicular to the observation axis, the first and second frames [21 and 22] being movable in a direction perpendicular to the direction in which other frame moves,
- a third frame [23] supported by the second frame [22] by means [30] used to maintain the third frame [23] blocked in the plane perpendicular to the observation axis, while leaving the third frame [23] free to move essentially along the observation axis, said third frame [23] presenting means [31 and 33] to immobilise the plate [2],- means [40] for ensuring a constant distance between the lens [3] and the observation face [2b]of the plate [2].and the sample observation or analysis device further comprises a light source for at least part of a sample and image acquisition means.

12. A device according to claim 11, wherein the light source is a lamp, a laser or an array of electroluminescent diodes.

* * * * *